United States Patent
Spence et al.

(10) Patent No.: US 9,352,669 B2
(45) Date of Patent: May 31, 2016

(54) ADJUSTABLE CHILD SEAT BASE

(71) Applicant: KIDS II, INC., Atlanta, GA (US)

(72) Inventors: Scott R. Spence, Vinings, GA (US);
Jacob Sclare, Dacula, GA (US);
Michael A. Dotsey, Pottstown, PA (US);
Noah E. Dingler, Phoenixville, PA (US);
Patrick B. Nolan, Royersford, PA (US)

(73) Assignee: KIDS II, INC., Atlanta, GA (US)

( * ) Notice: Subject to any disclaimer, the term of this patent is extended or adjusted under 35 U.S.C. 154(b) by 0 days.

(21) Appl. No.: 13/932,658

(22) Filed: Jul. 1, 2013

(65) Prior Publication Data
US 2014/0008955 A1 Jan. 9, 2014

Related U.S. Application Data

(60) Provisional application No. 61/667,543, filed on Jul. 3, 2012, provisional application No. 61/698,942, filed on Sep. 10, 2012.

(51) Int. Cl.
*B60N 2/26* (2006.01)
*B60N 2/28* (2006.01)

(52) U.S. Cl.
CPC .............. *B60N 2/2845* (2013.01); *B60N 2/26* (2013.01); *B60N 2/265* (2013.01); *B60N 2/2812* (2013.01); *B60N 2/2821* (2013.01); *B60N 2/2851* (2013.01); *B60N 2/2875* (2013.01); *Y10T 403/32237* (2015.01)

(58) Field of Classification Search
CPC ...... B60N 2/26; B60N 2/2821; B60N 2/2875; B60N 2/10

USPC .................. 297/256.16, 256.13, 256.1, 250.1
See application file for complete search history.

(56) References Cited

U.S. PATENT DOCUMENTS

| | | | |
|---|---|---|---|
| 4,733,909 A | | 3/1988 | Single, II et al. |
| 5,609,393 A | * | 3/1997 | Meeker ............... B60N 2/2821 297/216.19 |
| 5,836,650 A | | 11/1998 | Warner, Jr. et al. |
| 5,997,086 A | | 12/1999 | Gibson et al. |
| 6,017,088 A | | 1/2000 | Stephens et al. |
| 6,042,182 A | | 3/2000 | Geis et al. |
| 6,170,911 B1 | | 1/2001 | Kassai et al. |
| 6,299,249 B1 | | 10/2001 | Mori |
| 6,318,799 B1 | | 11/2001 | Greger et al. |
| 6,347,832 B2 | | 2/2002 | Mori |
| 6,554,358 B2 | * | 4/2003 | Kain ........................ 297/256.13 |
| 6,705,676 B1 | | 3/2004 | Berringer et al. |
| 7,059,677 B2 | | 6/2006 | Balensiefer et al. |
| 7,090,294 B2 | | 8/2006 | Balensiefer, II et al. |
| 7,207,628 B2 | | 4/2007 | Eros |
| 7,597,396 B2 | * | 10/2009 | Longenecker ....... B60N 2/2806 297/253 |
| 7,658,446 B2 | | 2/2010 | Meeker et al. |
| 8,056,975 B2 | * | 11/2011 | Longenecker et al. ....... 297/253 |
| 8,070,226 B2 | | 12/2011 | Dingler et al. |

(Continued)

*Primary Examiner* — Ryan Kwiecinski
(74) *Attorney, Agent, or Firm* — Gardner Groff Greenwald & Villanueva, PC

(57) ABSTRACT

An adjustable child seat base includes a seat base housing having first and second distal ends, a movable foot movably mounted to the seat base housing for movement between extended and retracted positions for adjusting the angle of the seat base, and a control handle and release positioned between the first and second distal ends of the seat base housing. The control handle and release is adapted for effecting one-handed control of the movement of the movable foot.

17 Claims, 9 Drawing Sheets

(56) References Cited

U.S. PATENT DOCUMENTS

| | | |
|---|---|---|
| 8,083,290 B2 | 12/2011 | Gillett |
| 8,353,559 B2 * | 1/2013 | Williams et al. ......... 297/256.13 |
| 2003/0164632 A1 * | 9/2003 | Sedlack ................. A47D 13/02 297/256.16 |
| 2006/0138825 A1 * | 6/2006 | Eros .................... B60N 2/2875 297/256.13 |
| 2011/0089731 A1 * | 4/2011 | Gibree ................. B60N 2/2806 297/250.1 |
| 2011/0169309 A1 * | 7/2011 | Williams ............. B60N 2/2806 297/256.13 |
| 2011/0193382 A1 * | 8/2011 | Gaudreau, Jr. ....... B60N 2/2821 297/256.13 |
| 2014/0097653 A1 * | 4/2014 | Chen ..................... B60N 2/286 297/256.13 |

* cited by examiner

ADJUSTABLE CHILD SEAT BASE

CROSS-REFERENCE TO RELATED APPLICATIONS

This application claims the priority benefit of U.S. Provisional Patent Application Ser. No. 61/667,543 filed Jul. 3, 2012 and U.S. Provisional Patent Application Ser. No. 61/698,942 filed Sep. 10, 2012, the entireties of which are hereby incorporated herein by reference for all purposes.

TECHNICAL FIELD

The present invention relates generally to the field of child safety products, and more particularly to an adjustable infant carrier or car seat base having a movable foot to provide for orienting the top of the seat base at a desired angle.

SUMMARY

In example embodiments, the present invention provides an adjustable child seat base. In example embodiments, the adjustable child seat base includes a seat base housing or body, a movable foot, and a control handle.

In one aspect, the present invention relates to an adjustable child seat base including a seat base body, a movable foot, a control handle, and a release control button. The seat base body includes first and second distal ends. The movable foot is movably mounted to the seat base body for raising and lowering one end of the seat base to allow the top of the seat base to be oriented at a desired angle. Preferably, the control handle is adapted to be grasped with one hand and is positioned between the first and second distal ends of the seat base body wherein the control handle is usable for lowering and lifting the seat base. Optionally, the release control button is positioned adjacent the control handle for selectively releasing and securing the movable foot to selectively allow the movable foot to move relative to the seat base body and to selectively lock the movable foot to the seat base body. Preferably, the movable foot can be extended by grasping the control handle, depressing the release/control button, and lifting up on the control handle, thereby raising one end of the seat base body and lowering the movable foot at the same time, and whereby the movable foot can be retracted by grasping the control handle, depressing the release/control button, and pushing down on the control handle, thereby lowering one end of the seat base body and retracting the movable foot at the same time.

In example forms, the movable foot is positioned generally adjacent one end of the seat base body and is pivotally mounted to the seat base body between the first and second distal ends of the seat base. The movable foot includes a pivoting foot which extends in a pivoting motion by gravity upon operation of the release/control button and a lifting force applied to the control handle. Optionally, the pivoting foot can be assisted by gravity or by a spring. The control handle is preferably positioned between the sides of the seat base body. Preferably, the release/control button comprises a thumb button positioned near the control handle in such a manner that as a user grasps the control handle, the user's thumb can easily engage the thumb button.

In another aspect, the invention relates to an adjustable child seat base including a seat base housing having first and second distal ends; a movable foot movably mounted to the seat base housing for movement between extended and retracted positions for adjusting the angle of the seat base; and a control handle and release positioned between the first and second distal ends of the seat base housing, the control handle and release being adapted for effecting one-handed control of the movement of the movable foot.

In example forms, the movable foot is pivotally mounted to the seat base housing. Preferably, the control handle and release is positioned generally adjacent the middle of the seat base housing, both side to side and end to end. In one form, the control handle and release includes a fixed handle and a thumb-operated release button. In another form, the control handle and release comprises a fixed handle and a finger-operated grip release button. In yet another form, the control handle and release comprises a movable handle grip which can be gripped and moved. In example forms, the movable handle grip is mounted for pivotal movement. Optionally, the movable handle grip is mounted for translation movement.

In still another aspect, the invention relates to an adjustable child seat base including a seat base housing, a movable foot, and a one-handed control. The seat base housing includes a first and second distal ends. The movable foot pivotally mounts to the seat base housing for movement between retracted and extended positions. The one-handed control is positioned between the first and second distal ends for controlling movement of the movable foot. In example forms, the one-handed control comprises a handle and a push-button. The handle and push-button are arranged such that a user can grip the handle with his or her hand and push the push-button with that hand's thumb. The one-handed control is adapted for both releasing/securing the movable foot and for lifting/lowering one distal end of the seat base housing relative to the movable foot.

These and other aspects, features and advantages of the invention will be understood with reference to the drawing figures and detailed description herein, and will be realized by means of the various elements and combinations particularly pointed out in the appended claims. It is to be understood that both the foregoing general description and the following brief description of the drawings and detailed description of the invention are exemplary and explanatory of preferred embodiments of the invention, and are not restrictive of the invention, as claimed.

DETAILED DESCRIPTION OF EXAMPLE EMBODIMENTS

Figure 1:
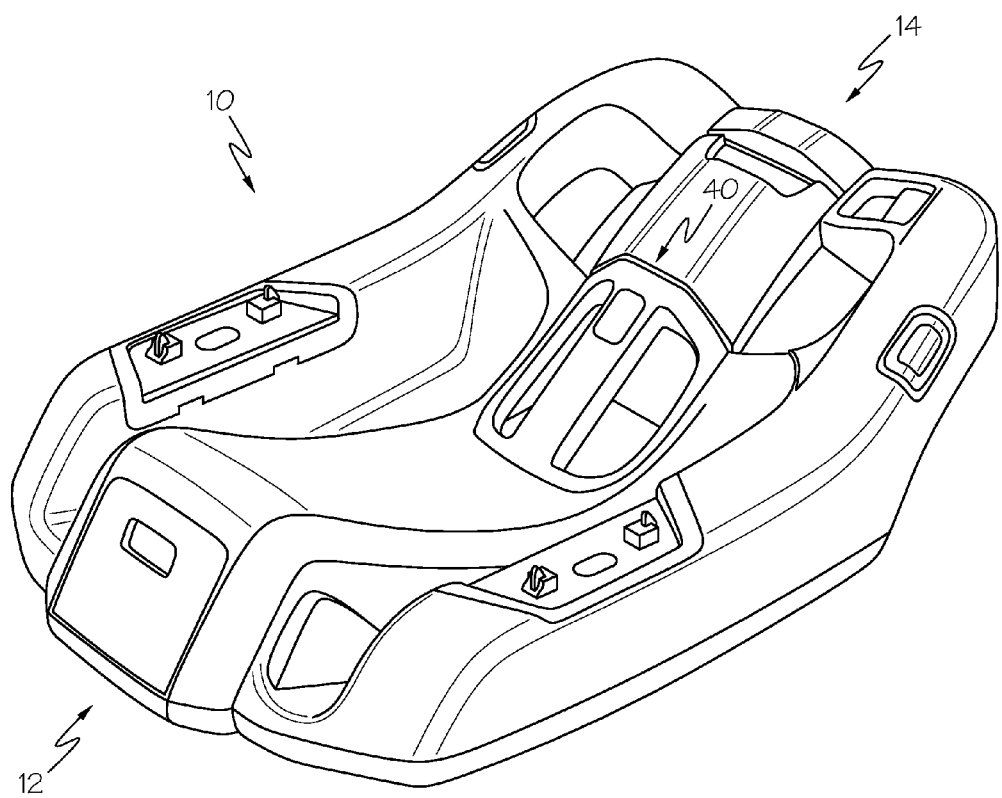
FIG. 1 is a front perspective view of a infant carrier seat base according to an example embodiment of the present invention.

The present invention may be understood more readily by reference to the following detailed description of the invention taken in connection with the accompanying drawing figures, which form a part of this disclosure. It is to be understood that this invention is not limited to the specific devices, methods, conditions or parameters described and/or shown herein, and that the terminology used herein is for the purpose of describing particular embodiments by way of example only and is not intended to be limiting of the claimed invention. Any and all patents and other publications identified in this specification are incorporated by reference as though fully set forth herein.

Also, as used in the specification including the appended claims, the singular forms "a," "an," and "the" include the plural, and reference to a particular numerical value includes at least that particular value, unless the context clearly dictates otherwise. Ranges may be expressed herein as from "about" or "approximately" one particular value and/or to "about" or "approximately" another particular value. When such a range is expressed, another embodiment includes from the one particular value and/or to the other particular value. Similarly, when values are expressed as approximations, by use of the antecedent "about," it will be understood that the particular value forms another embodiment.

With reference now to the drawing figures, wherein like reference numbers represent corresponding parts throughout the several views, FIGS. 1-6 show an infant carrier seat base body or seat base housing 10, generally comprising a movable foot 20, a control handle 40, and a release button 50. The seat base 10 preferably includes one or more releasable coupling elements for cooperative engagement with corresponding coupling elements of an infant carrier or seat (unshown) to provide selective attachment and removal of the carrier or seat to and from the base 10. In example embodiments, the seat base 10 generally comprises a first end 12 and a second (opposite) end 14, and comprises first and second lateral sides between the ends 12, 14, all together defining an area wherein the carrier or seat can be cooperatively engaged.

Figure 2A:
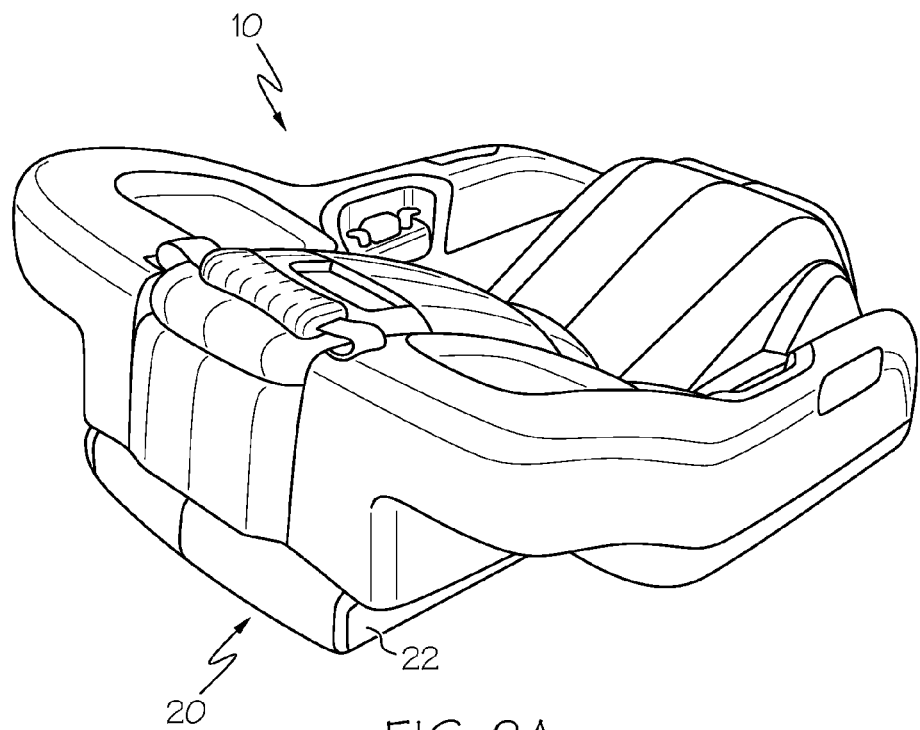
FIGS. 2A and 2B are rear perspective views of the infant carrier seat base of FIG. 1, showing a movable foot portion thereof in retracted and extended positions, respectfully.
Figure 2B:
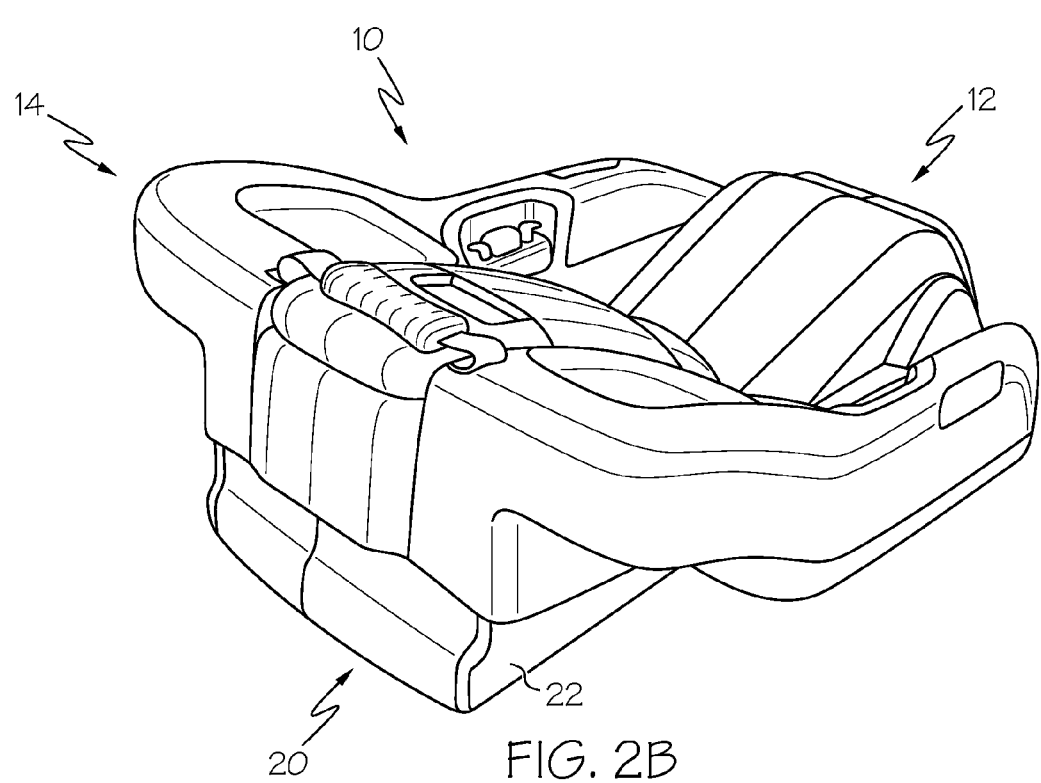
Figure 3:
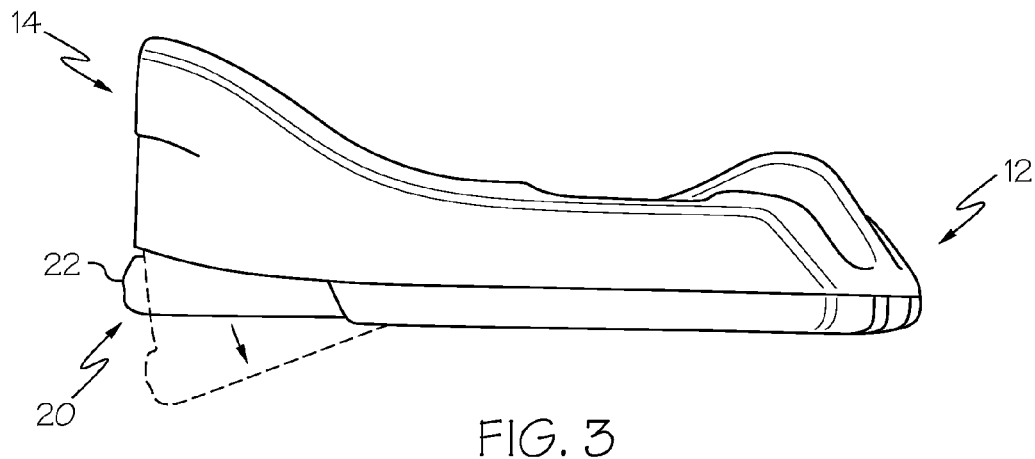
FIG. 3 is a side view of the infant carrier seat base of FIG. 1, showing a movable foot in a retracted position and with phantom lines depicting the movable foot in the extended position.

As depicted in FIGS. 2A-B, the movable foot 20 is movably mounted to the bottom side of the seat base 10 (generally adjacent the second end 14). Preferably, the movably mounted foot 20 is movable between a retracted position (FIG. 2A) and an extended position (FIG. 2B), thereby raising and lowering the second end of the base 10 to allow the top of the seat base 10 to be orientated at a desired angle with respect to a surface that is supporting the seat base 10. In example forms, the movable foot 20 is formed from a single unitary piece of plastic. In one form, the movable foot 20 comprises a pivoting foot 22 that is pivotally mounted to the seat base 10. For example, as depicted in FIG. 3, the pivoting foot 22 can pivot between the retracted position and the extended position (see phantom lines) such that the top of the seat base can be orientated at a desired angle with respect to the surface (generally horizontal) that is supporting the seat base 10. In one application, the seat base is to be mounted to a vehicle seat (like in the back seat of a car), and different vehicles have seat surfaces at different angles relative to the ground. In order to allow a child seat to be orientated at a desired angle relative to the ground despite the varied angle of the vehicle's seat surface, the present invention allows the top of the seat base to be orientated at various angles relative to the seat surface of the vehicle. In this regard, the pivoting foot can be adjustably positioned to orientate the seat base at a preferred or desired angle. One skilled in the art will appreciate that other means for movably mounting the movable foot to the base 10 may include translatable mounting and/or other movable mounting means.

Figure 4:
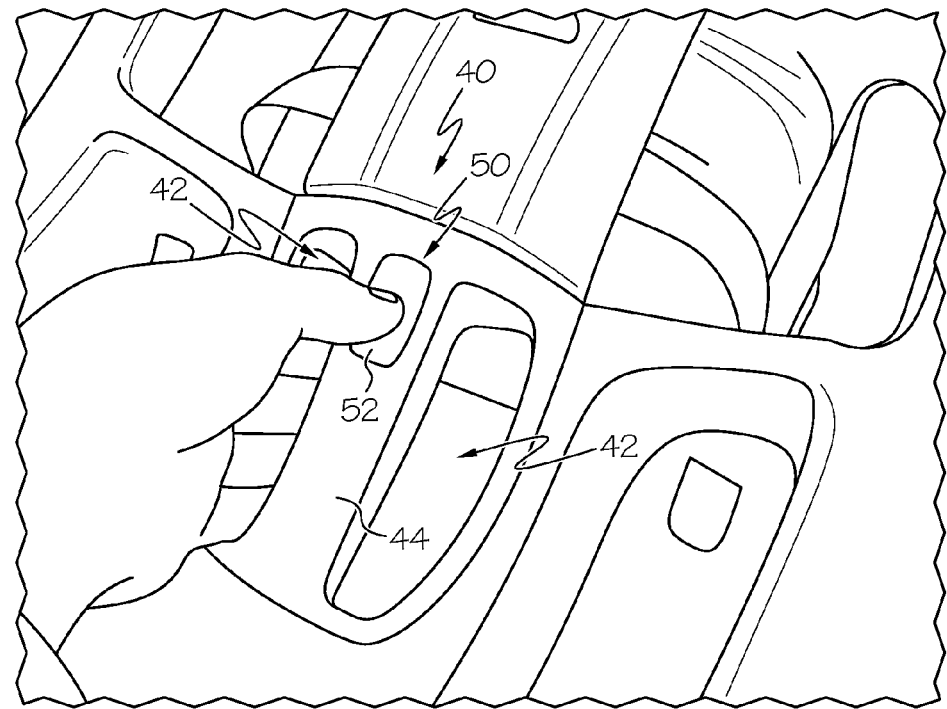
FIG. 4 is a perspective view of the control handle of the infant carrier seat base of FIG. 1, showing a user's thumb engaging the release control button.

The control handle 40 is provided for being grasped by the user to initiate the change of position of the movable foot 20, and preferably comprises a release/control button 50 movably mounted to a portion thereof. In example embodiments, actuation or operation of the button 50 allows the user to adjust the position (retracted, expanded, any position therebetween) of the movable foot 20. In one form, the control handle is a one-handed control handle 40 and is positioned generally adjacent the middle of the seat base 10, both side-to-side and end-to-end. Optionally, the control handle 40 can be positioned at any location within the defined area between the ends 12, 14 and adjacent sides, and/or along outer or external portions thereof (see dashed lines in FIG. 5C). As depicted in FIGS. 1 and 4, the one-handed control handle 40 is generally positioned in the middle of the seat base 10. Preferably, the release control button 50 comprises a thumb button 52 positioned adjacent the control handle 40 in such a manner that as the user grasps the control handle 40, the user's thumb can easily engage the thumb button 52. Two openings 42 are generally formed adjacent a central handle member 44 wherein the user can insert one or more fingers to grasp the control handle 40. As such, the release control button 50 is movably mounted to or adjacent the central handle member 44 and is biased outwardly (as seen in FIG. 1) by a spring or other biasing means. Optionally, the release control button 50 can be integrally formed with the control handle 40. Further optionally, the release control button 50 can be positioned on a bottom portion of the control handle 40 to provide for actuation thereof by the user's index or pointer finger.

Figure 5A:
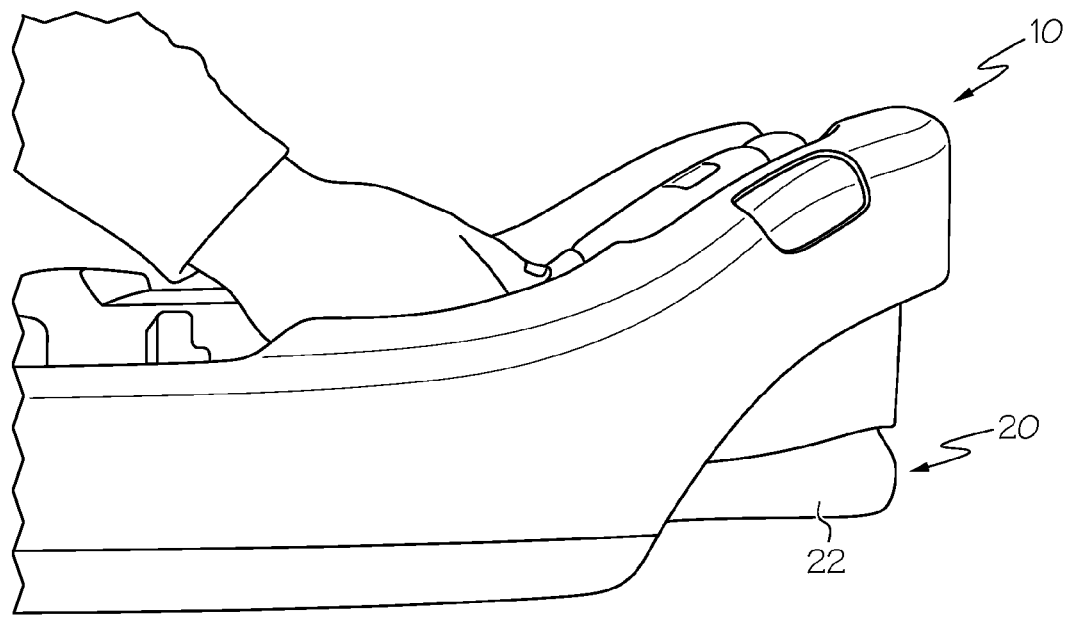
FIG. 5A is a side view of the infant carrier seat base of FIG. 1, showing a user grasping the control handle and pressing the release control button and showing the movable foot in a retracted position.
Figure 5B:
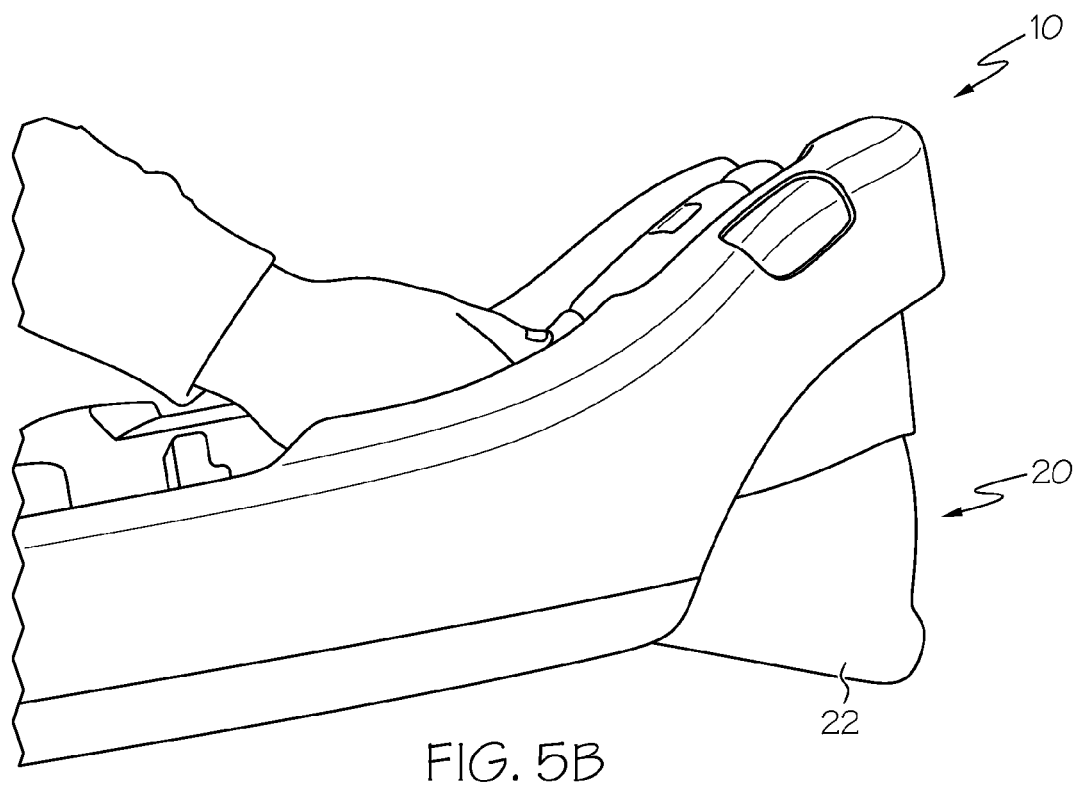
FIG. 5B is a side view of the infant carrier seat base of FIG. 1, showing a user grasping a control handle and pressing a release control button thereof and wherein the movable foot is in the extended position.
Figure 5C:
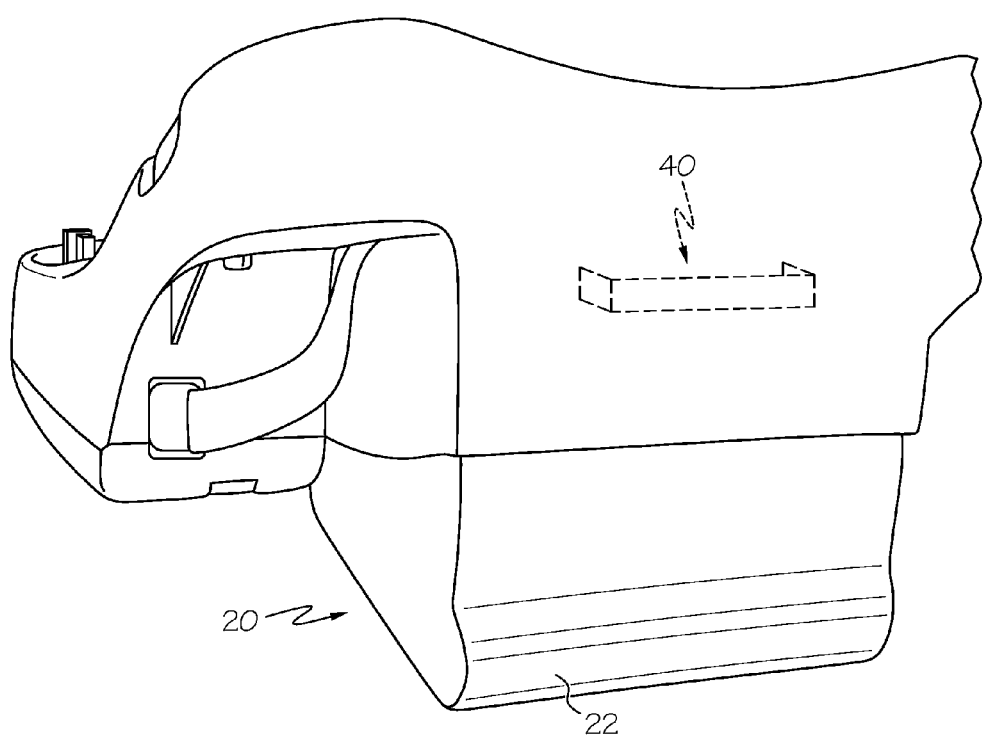
FIG. 5C is a rear perspective view of the infant carrier seat base of FIG. 5B.

After or as the user grasps the one-handed control handle 40, the user's thumb engages the thumb button 52 (against the bias on the biasing means), which causes the thumb button 52 to depress (see FIG. 4) and allows the pivoting foot 22 to extend in a pivoting motion by gravity between the retracted position (FIG. 5A), the extended position (FIGS. 5B-C), or any position therebetween. For example, from the retracted position of FIG. 5A, the user applies a lifting force to the control handle 40 while depressing the push button 22, which begins to lift the second end off of the surface and allows the pivoting foot 22 to extend therefrom in a pivoting motion. Thus, after the thumb button is depressed, an actuation mechanism 60 (as will be described below) disengages the movable foot 20 from the seat base 10 such that gravity forces the pivoting foot 22 to extend therefrom in a pivoting motion until being stopped at the extended position (FIGS. 5B-C). At the same time the movable foot 20 is pivotally extending therefrom, the user is applying a lifting force on the handle 40, causing the second end 14 to lift. Similarly, when the pivoting foot 22 is in an extended position, depressing the ejection button 52 causes the pivoting foot 52 to retract within the seat base 10 (assisted by gravity due to the weight of the seat base 10 acting against the movable foot). In some forms, it may be necessary or advantageous to apply a downward or pressing force against the control handle 40 to cause the pressing foot to retract within the seat base 10. One skilled in the art will appreciate that biasing means or spring assistance can be provided with the movable foot 20 such that other forces besides gravity can assist the extension and/or retraction of the movable foot 20. Thus, in some cases, it may be necessary to apply a force (in addition to the weight of the seat base 10) to cause retraction of the movable foot 20. Alternatively, the movable foot 22 and/or the seat base 10 can be weighted to assist in pulling or moving them downward.

Figure 6:
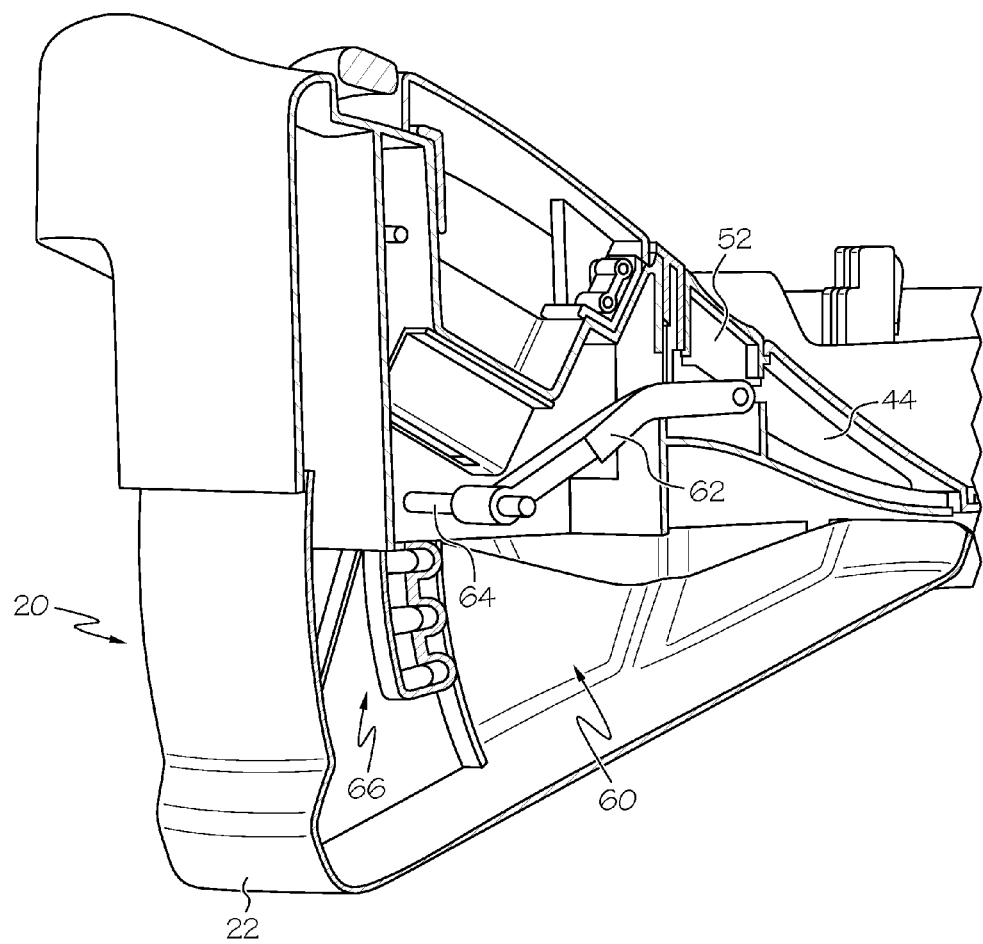
FIG. 6 is a partial cross-sectional view of the infant carrier seat base of FIG. 1, showing an actuation system for allowing movement of the movable foot between retracted and extended positions.

The actuation mechanism 60 is generally provided for securing the movable foot 20 to the seat base 10 and for removing the same upon actuation or operation of the release control button 50, allowing the movable foot 20 to move between the retracted position and the extended position (see FIG. 6). In one example form, the actuation mechanism 60 comprises a link or linkage 62, an engaging element 64, and an engaged element 66. The link 62 generally comprises a slightly bent arm-like member having one end pivotally mounted to the release control button 50 and another end pivotally mounted to the engaging element 64. The engaging element 64 comprises a pin or rod-like member that generally extends transversely from the bent arm-like member and acts to engage the engaged element 66. The engaged element 66 is generally in the form of a plurality of notches or engagement ribs 66 extending from an internal portion of the foot 50. The notches 66 can be fixedly/removably mounted thereto and/or integrally formed therewith. As such, actuation of the release control button 50 causes movement of the link 62, which in turn causes the engaging element 64 to disengage the engaged element 66 of the foot 50, thereby freeing the movable foot 50 from engagement to allow for pivotal movement thereof whereby the foot 20 can be positioned between the retracted position and the extended position. Thus, while the release button is pressed, disengagement is provided between the engaging element 64 and the engaged element 66 whereby the movable foot 50 can move between the retracted position and the expanded position. One skilled in the art will appreciate that other actuation means including engagement/disengagement mechanisms, linkages, engaging and/or engaged elements, or other mechanisms or elements or combinations thereof may be used with the present invention as desired.

Figure 7A:
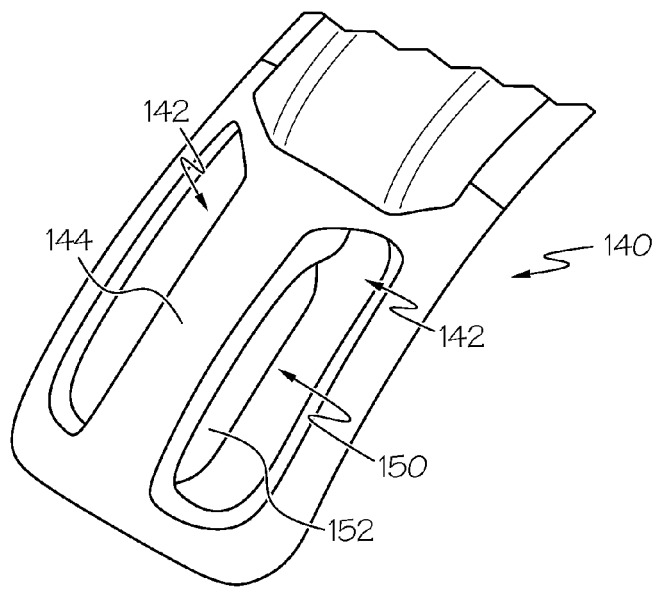
FIGS. 7A and 7B are perspective views of a control handle and release control button according to another example embodiment of the present invention.
Figure 7B:
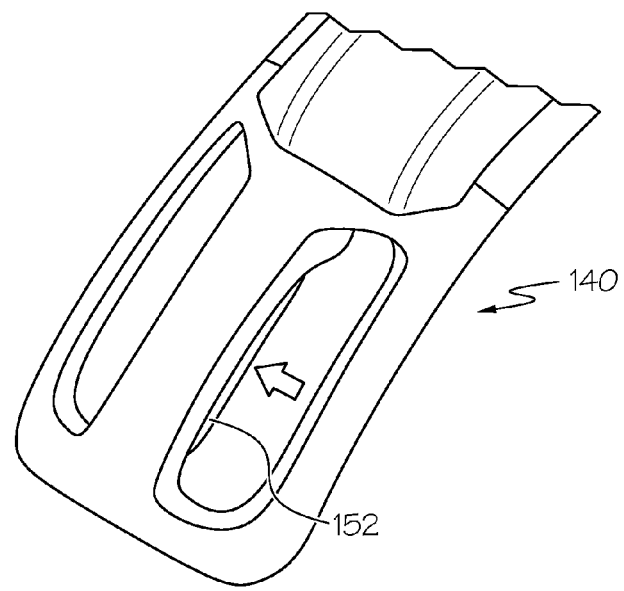

In additional example embodiments, other forms of control handles and/or release control buttons may be optionally used with the present invention. FIGS. 7A-B show a control handle 140 generally comprising two openings 142, a central handle member 144, and a release control button 150. In example forms, the release control button 150 comprises an ejection button 152 positioned on an internal side of the central handle member 144 wherein the user's fingers can provide engagement therewith to depress the same (see FIG. 7B) such that the movable foot can move between the retracted position and the extended position.

Figure 8A:
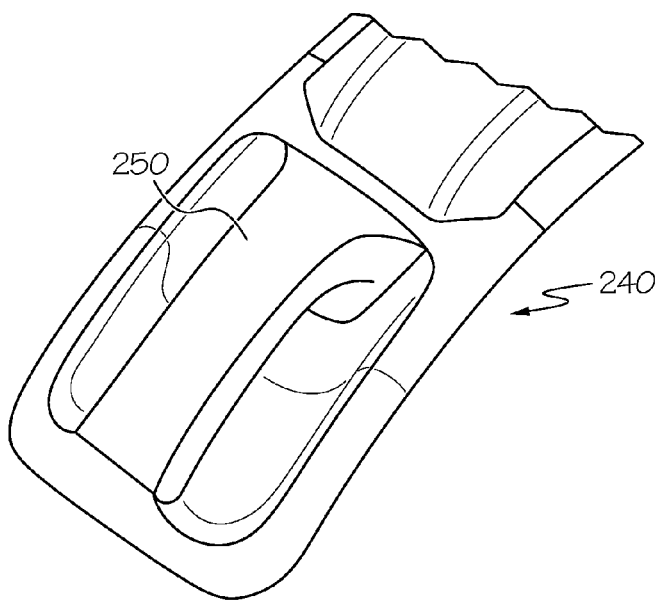
FIGS. 8A and 8B are perspective views of a control handle portion of an adjustable seat base according to yet another example embodiment of the present invention.
Figure 8B:
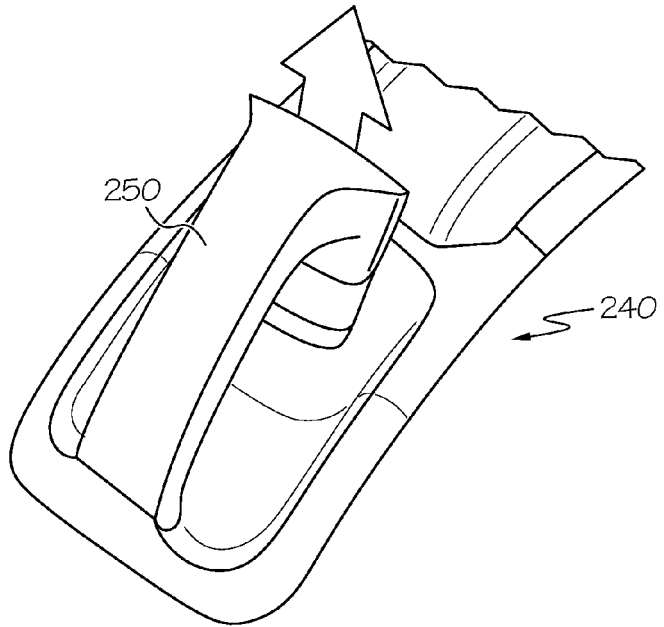

In yet additional example embodiments, the control handle can be in the form of a movable handle grip mounted for pivotal or translation movement. For example, as shown in FIGS. 8A-B, a movable handle grip 250 is pivotally mounted to a recessed control portion 240. Preferably, the user grasps the handle grip 250 and forces the same to pivot (see FIG. 8B), which causes disengagement of the engaging and engaged elements to position the movable foot 20 in a desired position between the retracted position and the extended position.

Figure 9:
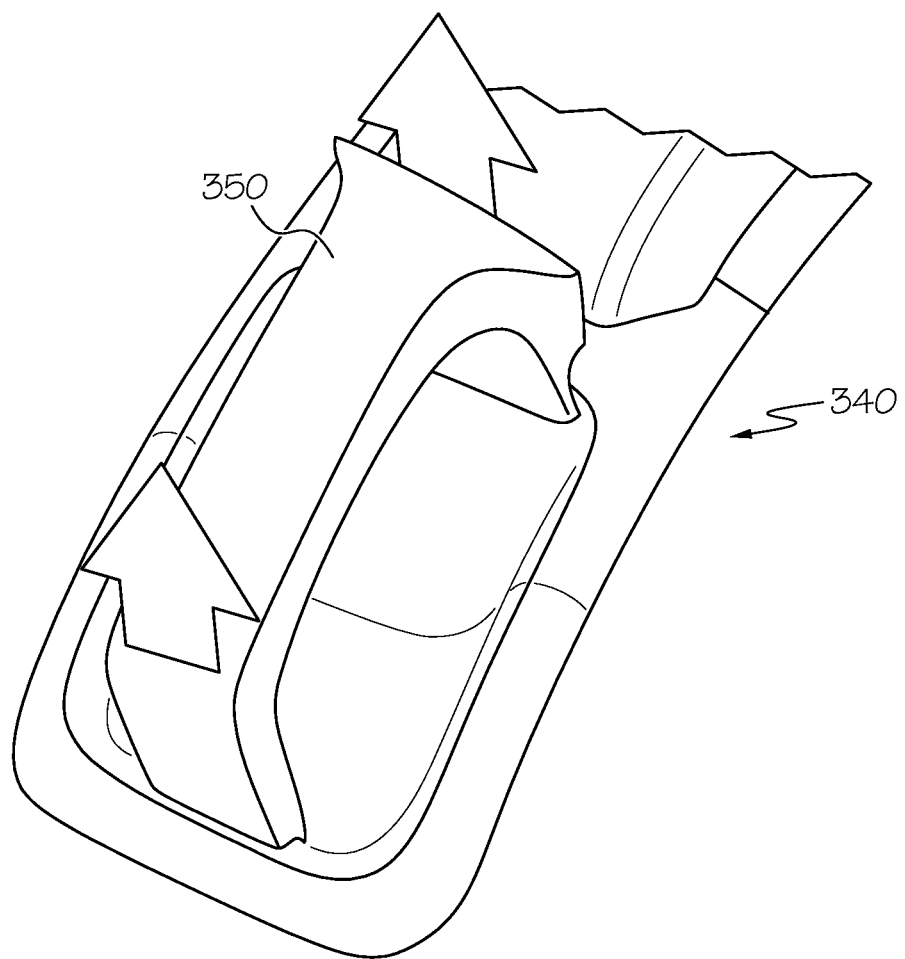
FIG. 9 is a perspective view of a control handle portion of an adjustable seat base according to another example embodiment of the present invention

Alternatively, as shown in FIG. 9, a movable handle grip 350 is translatably mounted to a recessed control portion 140. Grasping the handle grip 350 and applying a lifting force causes the same to translate from the recessed control portion 340 to an extended position (FIG. 9), which causes disengagement of the engaging and engaged elements to position the movable foot as desired.

Thus, it is desired that operation of the control handle, handle grip or other portions of the above-described embodiments be one-handed such that they can be grasped, lifted, and provide convenient actuation means for adjusting the position of the movable foot. Similarly, in embodiments where the movable foot is provided with biasing means for causing the movable foot to be assisted to the extended position or the retracted position, the control handle, handle grip or other portions of the embodiments described above can be adapted to assist the user.

While the invention has been described with reference to preferred and example embodiments, it will be understood by those skilled in the art that a variety of modifications, additions and deletions are within the scope of the invention, as defined by the following claims.

What is claimed is:

1. An adjustable child seat base configured for one-handed adjustment by a user, the seat base comprising:
   a seat base housing having first and second distal ends;
   a movable foot movably mounted to the seat base housing for movement between extended and retracted positions for adjusting an angle of an upper portion of the seat base; and
   a control handle and release positioned between the first and second distal ends of the seat base housing, the seat base housing comprising at least one opening adjacent the control handle, the opening being configured to receive one or more fingers of a user's hand when the user grips the handle with the hand, and the release being positioned adjacent the control handle and configured for one-handed actuation of the release by the same hand of the user while gripping the handle to adjust the position of the movable foot relative to the seat base, thereby adjusting the angle of the upper portion of the seat base.

2. An adjustable child seat base as claimed in claim 1, wherein the movable foot is pivotally mounted to the seat base housing.

3. An adjustable child seat base as claimed in claim 1, wherein the control handle and release is positioned generally adjacent the middle of the seat base housing, both side to side and end to end.

4. An adjustable child seat base as claimed in claim 1, wherein the control handle and release comprises a fixed handle and a thumb-operated release button.

5. An adjustable child seat base as claimed in claim 1, wherein the control handle and release comprises a fixed handle and a finger-operated grip release button.

6. An adjustable child seat base as claimed in claim 1, wherein the control handle and release comprises a movable handle grip which can be gripped and moved.

7. An adjustable child seat base as claimed in claim 6, wherein the movable handle grip is mounted for pivotal movement.

8. An adjustable child seat base as claimed in claim 6, wherein the movable handle grip is mounted for translation movement.

9. An adjustable child seat base configured for one-handed adjustment by a user, the seat base comprising:
   a seat base body having first and second distal ends;
   a movable foot movably mounted to the seat base body for raising and lowering one end of the seat base body to allow the top of the seat base body to be oriented at a desired angle;
   a control handle adapted to be grasped with one hand and being positioned between the first and second distal ends of the seat base body, the control handle being usable for lowering and lifting the seat base body;
   a release and control button positioned adjacent the control handle for selectively releasing and securing the movable foot to selectively allow the movable foot to move relative to the seat base body and to selectively lock the movable foot to the seat base body; and
   whereby the movable foot can be extended by the user grasping the control handle with one hand, actuating the release and control button with the same one hand grasping the control handle, and lifting up on the control handle, thereby raising one end of the seat base body and lowering the movable foot at the same time, and whereby the movable foot can be retracted by the user grasping the control handle with one hand and actuating the release and control button with the same one hand grasping the control handle, and pushing down on the control handle, thereby lowering one end of the seat base body and retracting the movable foot at the same time.

10. An adjustable child seat base as claimed in claim 9, wherein the movable foot is positioned generally adjacent one end of the seat base body and is pivotally mounted to the seat base body between the first and second distal ends of the seat base body, the movable foot being pivotally mounted at one end thereof to the seat base body.

11. An adjustable child seat base as claimed in claim 9, wherein the movable foot comprises a pivoting foot and wherein the pivoting foot extends in a pivoting motion by gravity upon operation of the release/control button and a lifting force applied to the control handle.

12. An adjustable child seat base as claimed in claim 9, wherein the control handle is positioned between sides of the seat base body.

13. An adjustable child seat base as claimed in claim 9, wherein the release/control button comprises a thumb button positioned adjacent the control handle in such a manner that as a user grasps the control handle, the user's thumb can easily engage the thumb button.

14. An adjustable child seat base configured for one-handed adjustment by a user, the seat base comprising:
   a seat base body having first and second distal ends and first and second lateral sides between the first and second distal ends;
   a movable foot pivotally mounted to the seat base body for movement between retracted and extended positions; and
   a one-handed control generally positioned at a middle portion between the first and second distal ends and the first and second lateral sides for controlling movement of the movable foot between the retracted and extended positions by a user gripping and actuating the one-handed control with one hand;
   wherein the one-handed control comprises a handle and a push-button, and wherein the handle and push-button are arranged such that a user can grip the handle with his or her hand and push the push-button with that hand's thumb, and wherein the handle comprises a fixed handle.

15. An adjustable child seat base configured for one-handed adjustment by a user, the seat base comprising:
   a seat base body having first and second distal ends and first and second lateral sides between the first and second distal ends;
   a movable foot pivotally mounted to the seat base body for movement between retracted and extended positions; and
   a one-handed control generally positioned at a middle portion between the first and second distal ends and the first and second lateral sides for controlling movement of the movable foot between the retracted and extended positions by a user gripping and actuating the one-handed control with one hand;
   wherein the one-handed control is adapted for both releasing and securing the movable foot and for lifting and lowering one distal end of the seat base body relative to the movable foot.

16. An adjustable child seat base as claimed in claim 15, wherein the one-handed control comprises a handle and a push-button.

17. An adjustable child seat base as claimed in claim 16, wherein the handle and push-button are arranged such that a user can grip the handle with his or her hand and push the push-button with that hand's thumb.

* * * * *